«12» United States Patent
Harrison

«10» Patent No.: US 9,586,533 B2
«45» Date of Patent: Mar. 7, 2017

«54» TRUCK BOX WITH FOLDED WALLS

«71» Applicant: Craig Harrison, Gulf Breeze, FL (US)

«72» Inventor: Craig Harrison, Gulf Breeze, FL (US)

«73» Assignee: Daws Manufacturing Co., Inc., Pensacola, FL (US)

«*» Notice: Subject to any disclaimer, the term of this patent is extended or adjusted under 35 U.S.C. 154(b) by 128 days.

«21» Appl. No.: 14/587,719

«22» Filed: Dec. 31, 2014

«65» Prior Publication Data
US 2016/0185305 A1    Jun. 30, 2016

«51» Int. Cl.
B60R 9/00      (2006.01)
B60R 11/06     (2006.01)
B23K 31/02     (2006.01)
B62D 33/027    (2006.01)
B60R 9/06      (2006.01)

«52» U.S. Cl.
CPC .......... B60R 11/06 (2013.01); B23K 31/02 (2013.01); B60R 9/065 (2013.01); B62D 33/0273 (2013.01)

«58» Field of Classification Search
CPC  B60R 11/06; B60R 9/065; B60R 9/06; B60R 2011/004; B65D 7/34; B23K 31/02; B62D 33/0273

USPC ............................ 224/404; 220/62, 689, 682
See application file for complete search history.

«56» References Cited

U.S. PATENT DOCUMENTS

| 1,177,513 | A | * | 3/1916 | Gustafson | B65D 7/24 220/4.31 |
| 1,480,654 | A | * | 1/1924 | Beardsley | B65D 7/34 220/689 |
| 3,019,833 | A | * | 2/1962 | Reardon | B21D 51/2646 493/167 |
| 3,479,683 | A | * | 11/1969 | Hull | E05D 3/02 16/263 |
| 4,705,317 | A | * | 11/1987 | Henri | B62D 33/02 224/404 |
| 4,871,077 | A | * | 10/1989 | Ogden | B65D 39/0076 215/307 |
| 5,160,061 | A | * | 11/1992 | Stolzman | B29C 63/0034 156/69 |
| 5,938,264 | A | * | 8/1999 | Yates | B60R 9/00 220/62 |
| 6,206,228 | B1 | * | 3/2001 | Roth | B65D 7/34 220/1.5 |

* cited by examiner

Primary Examiner — Adam Waggenspack
«74» Attorney, Agent, or Firm — GrayRobinson, P.A.; Thomas L. Kautz

«57» ABSTRACT

A cross-over truck box is provided having folded end walls and folded tub ends that permit the box to be fabricated efficiently, at reduced cost and with improved strength.

7 Claims, 14 Drawing Sheets

TRUCK BOX WITH FOLDED WALLS

FIELD OF THE INVENTION

This invention relates to storage boxes for use with vehicles, and, more particularly, to a crossover truck box having a folded wall construction that reduces cost, simplifies fabrication and adds strength.

BACKGROUND OF THE INVENTION

One of the most popular accessories for trucks and recreational vehicles is a truck box used to store and secure a variety of tools and other items. One type of truck box is a cross-over box which comprises a front wall, a back wall, a bottom wall and opposed end walls which are interconnected to form a hollow interior. The truck box interior is closed by a top wall or lid pivotal between open and closed positions on a hinge mounted to the back wall, usually with the assistance of gas springs. Each of the end walls of a cross-over box is formed with a wing extension which rests atop the side walls of a pickup truck, for example, where it may be connected by clamps or other fastening devices to secure the box in place within the truck bed.

Cross-over boxes are typically made of aluminum tread plate or a similar material which can undergo bending and welding operations in the fabrication process. With reference to FIGS. 1-5 of the drawings, labeled "Prior Art," several views are provided depicting a cross-over truck box 10 constructed using conventional prior art fabrication techniques. Initially, a sheet 12 of tread plate undergoes a bending operation in which it is formed into a tub 14 having a bottom wall 16 joined to upright side walls 18, 20 collectively defining an interior 22 open at the top and opposite ends. The end walls 24, 26 of the box 10 are each formed in a bending operation from a sheet 28 of tread plate and have a wing extension 30. In order to close the ends of the tub 14, each end wall 24, 26 is positioned at one end and welded in place, e.g. a weld is required along the length of the side edges of each end wall 24, 26 and the end edges of the tub side walls 18, 20, and, along the bottom edge of each end wall 24, 26 and opposed end edges of the bottom wall 16 of tub 14. Further, to provide a secure connection between the side walls 18, 20 of the tub 14 and the wing extension 30 of each end wall 24, 26, each side wall 18, 20 is preferably formed with an outwardly extending arm 32 at opposite ends. These arms 32 extend along one side of each wing extension 30 where they are welded in place.

Figure 1:
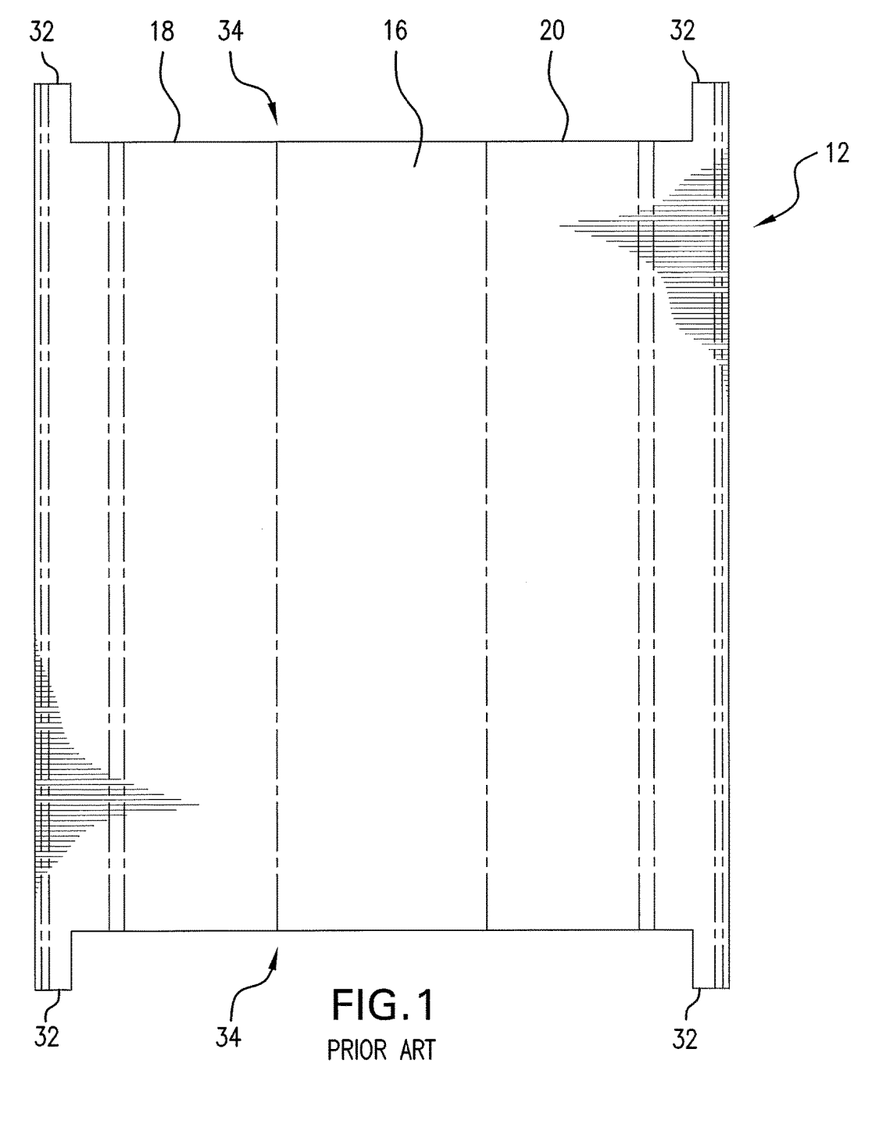
FIG. 1 is a plan view of a sheet employed to fabricate the tub of a prior art cross-over truck box.
Figure 2:
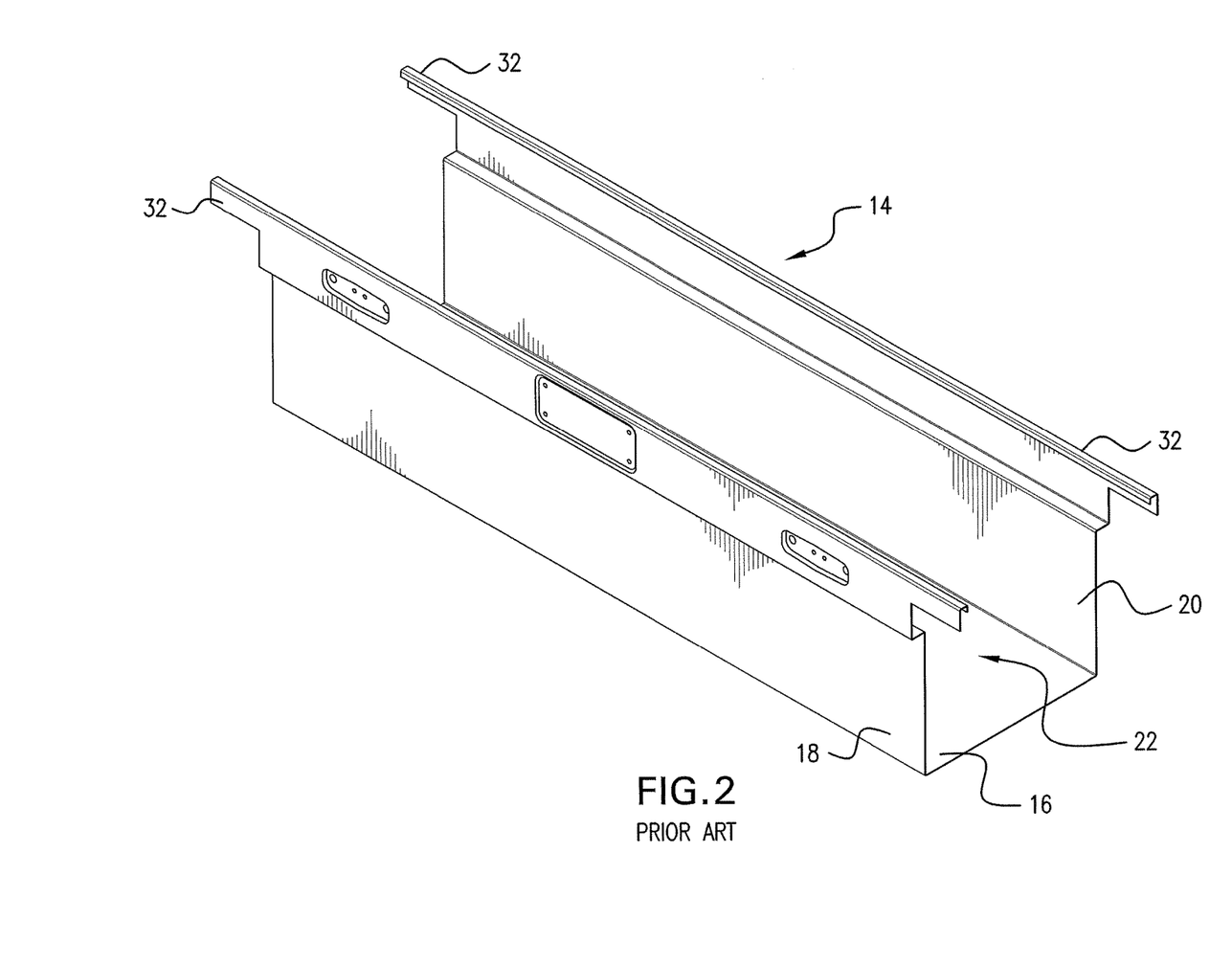
FIG. 2 is a perspective view of the tub formed in a bending operation from the sheet depicted in FIG. 1.
Figure 3:
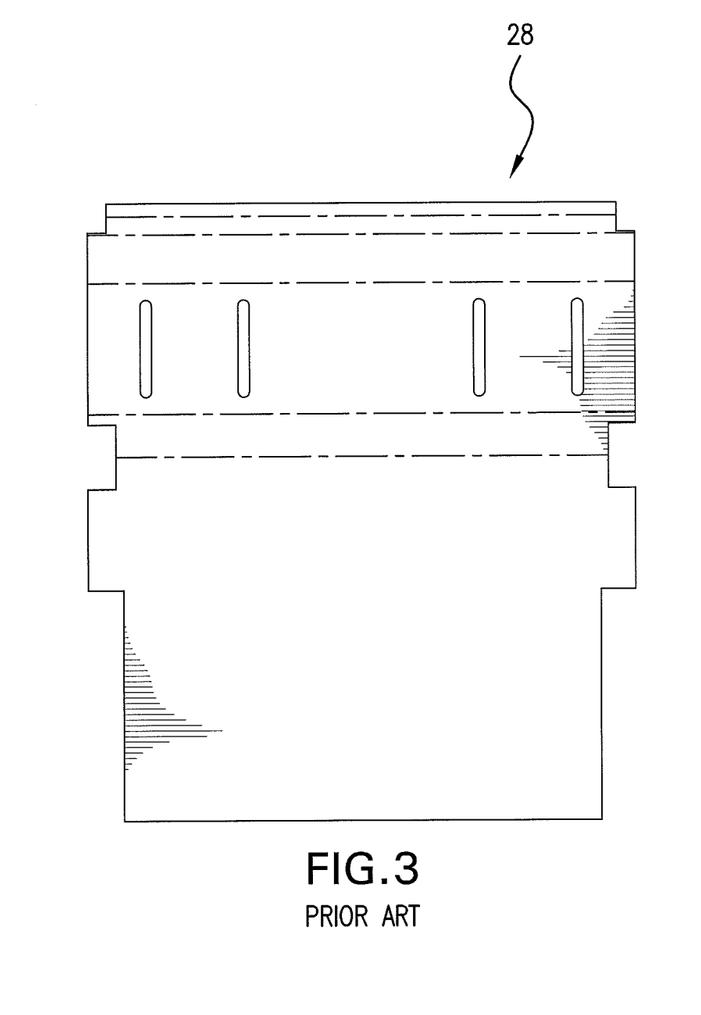
FIG. 3 is a plan view of sheet of a sheet used in the fabrication of an end wall for connection to the tub shown in FIG. 2.
Figure 4:
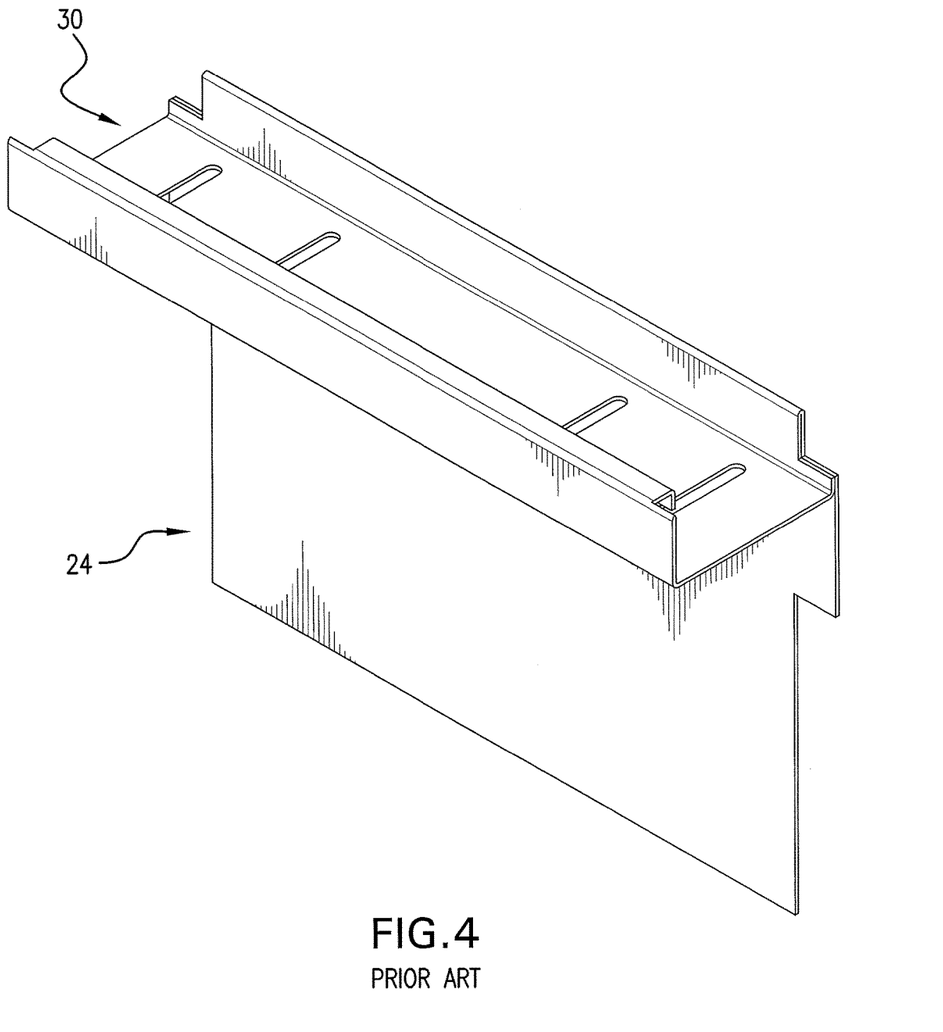
FIG. 4 is a perspective view of an end wall formed in a bending operation from the sheet illustrated in FIG. 3.
Figure 5:
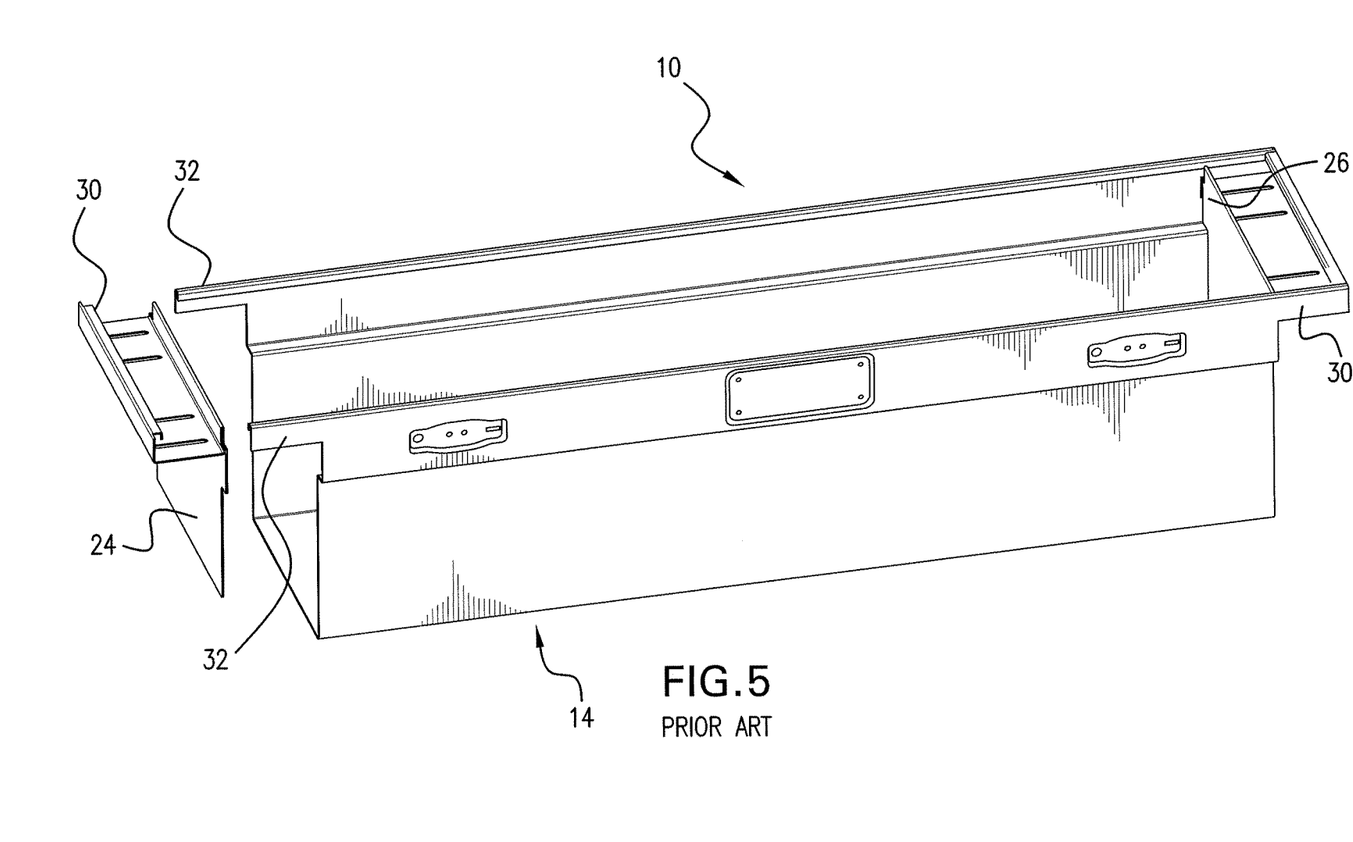
FIG. 5 is a perspective view of a partially assembled cross-over truck box from the tub and end walls shown in FIGS. 1-4.

The method of fabrication used to manufacture cross-over truck boxes described above is labor-intensive and relatively expensive considering all of the welds required to connect the end walls 24, 26 to the tub 14. Further, as best seen in FIG. 1, a section 34 of material at both ends of the sheet 12 forming tub 14 must be removed prior to the bending operation in order to form the arms 32 which connect to the end wall wing extensions 30. This drop loss is significant and represents an appreciable amount of lost revenue for manufacturers of truck boxes using such prior art fabrication method, given the high cost of aluminum tread plate.

SUMMARY OF THE INVENTION

This invention is directed to a cross-over truck box having folded end walls and folded tub ends that permit the box to be fabricated efficiently, at reduced cost and with improved strength compared to typical prior art cross-over boxes.

In the presently preferred embodiment, a cross-over truck box is provided comprising a tub formed in a bending operation with a bottom wall joined to opposed upright side walls collectively defining an interior open at the ends and at the top. Opposite end edges of each side wall of the tub are folded over to form side mounting channels, and opposite end edges of the bottom wall of the tub are folded over to form bottom mounting channels. Each channel has an opening which faces the interior of the tub. Additionally, opposite ends of each side wall are formed with a guide at an upper end thereof The cross-over box further comprises opposed end walls each formed in a bending operation with a wing extension along a top portion thereof, a side flange along opposite side edges and a bottom flange along a bottom edge.

The cross-over box is assembled by inserting the wing extension of one end wall at least partially into the guides of the two side walls at one end of the tub such that the majority of the end wall is located at an angle within the interior of the tub. The bottom portion of the end wall is then moved toward such end of the tub so that the side flanges of the end wall enter the side mounting channels of the side walls of the tub and the bottom flange of the end wall enters the bottom mounting flange of the bottom wall of the tub. The same procedure is repeated for the other end wall at the opposite end of the tub. The flanges of the end walls may be secured within the channels of the tub by any suitable means, such as tack welding, crimping, bonding and the like.

The cross-over box of this invention, and its method of fabrication, is less expensive and more efficient than the prior art noted above. The extent of drop loss of material is substantially reduced, and the time-consuming and expensive welding operations required to assemble prior art boxes may be eliminated or at least substantially reduced.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Referring now to FIGS. 6-12, one embodiment of a cross-over truck box 40 in accordance with this invention is illustrated. One part of the fabrication process is the formation of a tub 42 best seen in FIGS. 6-8. For purposes of the present discussion, the terms "vertical," "horizontal," "upwardly," "upper," "upright" and "lower" refer to the orientation of the box 40 and tub 42 as shown in FIGS. 6-12.

Figure 6:
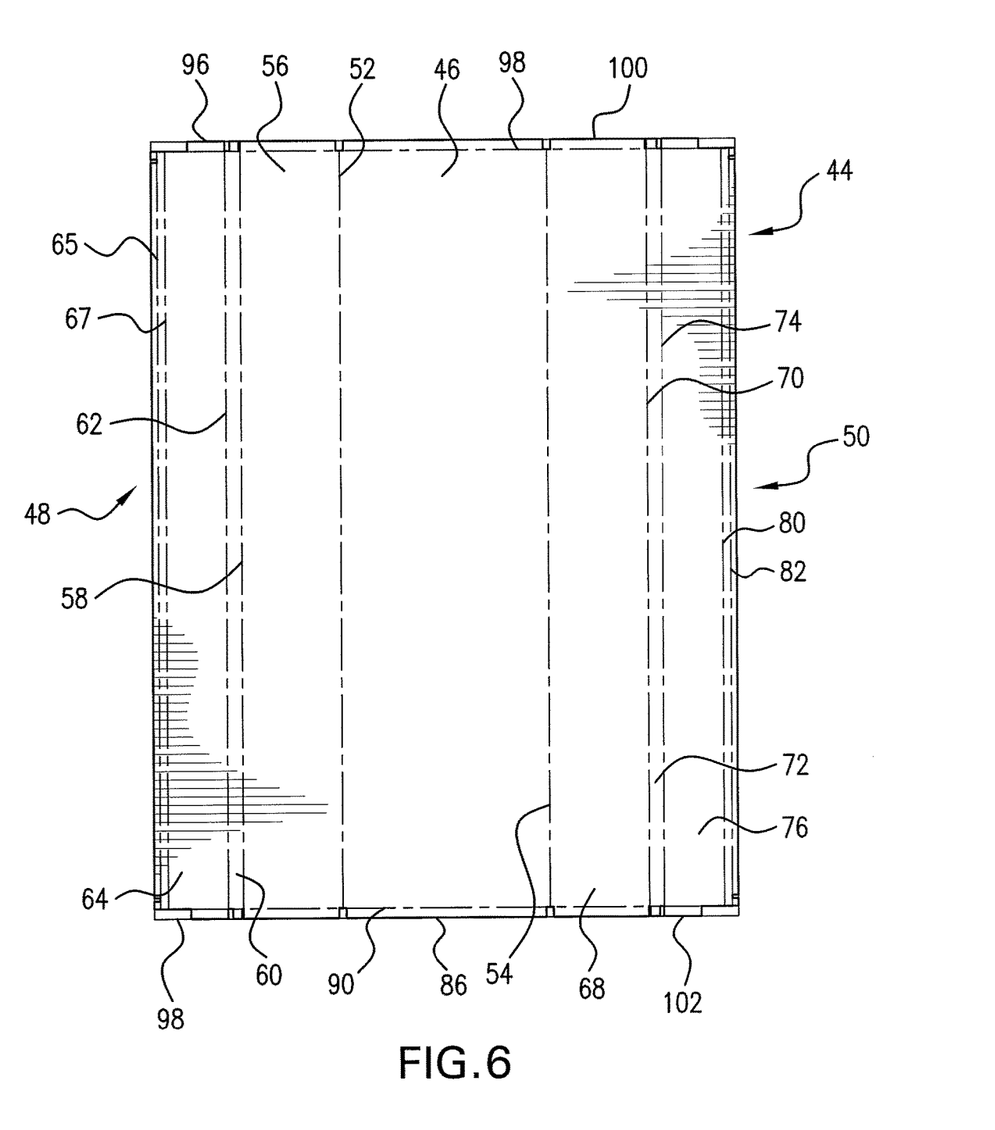
FIG. 6 is a plan view of a sheet employed to fabricate the tub of the cross-over truck box of this invention.
Figure 7:
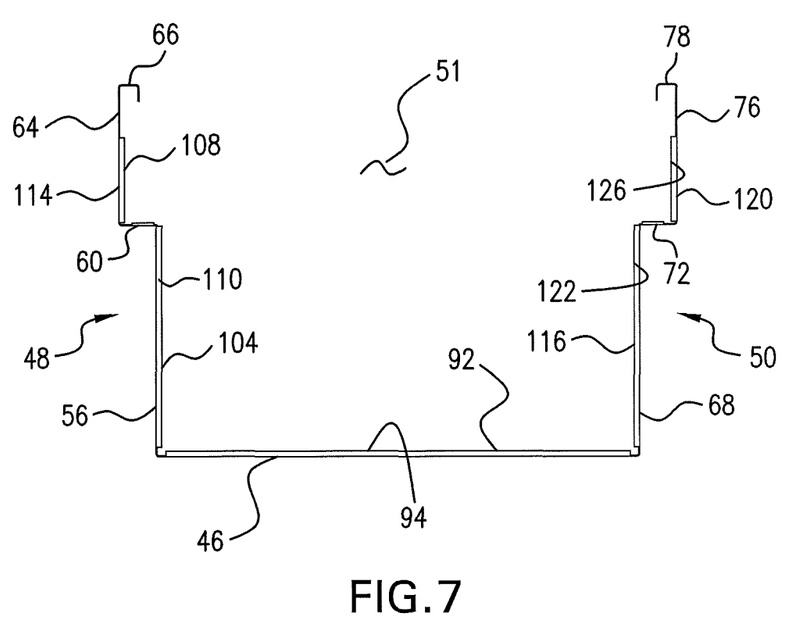
FIG. 7 is an end view of a tub formed in a bending operation from the sheet shown in FIG. 6.
Figure 8:
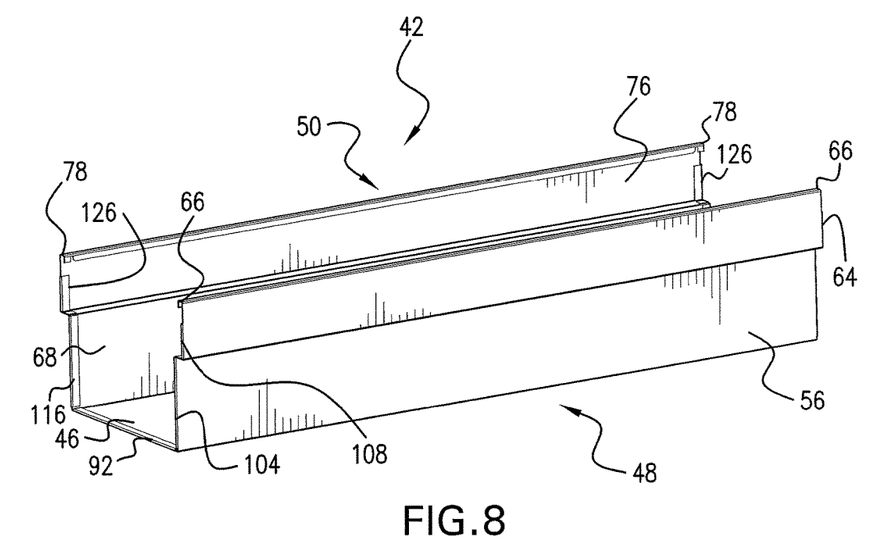
FIG. 8 is a perspective view of the tub depicted in FIG. 7.

Initially, a blank or sheet 44 of aluminum tread plate or similar material undergoes a bending operation to form the tub 42. In the presently preferred embodiment, the tub 42 comprises a bottom wall 46 joined to two upright side walls 48 and 50 defining an interior 51 which is open at the ends and at the top. A fold line 52 is shown in FIG. 6 to depict where sheet 44 is folded to form the juncture of bottom wall 46 and side wall 48, and sheet 44 is bent at fold line 54 to form side wall 50. The side wall 48 includes a lower section 56 between fold line 52 and a fold line 58 shown in FIG. 6, a seat 60 between fold line 58 and a fold line 62, and, an upper section 64 joined to seat 60 at fold line 62. The upper and lower sections 64, 56 of side wall 48 are generally vertically oriented, and the seat 60 extends generally horizontally between them. As seen in FIG. 6, an inverted, U-shaped guide 66 is formed in a bending operation of sheet 44 along fold lines 65 and 67, and it extends vertically upwardly from the upper section 64 of side wall 48. Similarly, the side wall 50 has a vertical lower section 68 formed by bending along fold lines 54 and 70, a horizontally extending seat 72 between fold lines 70 and 74, and, a vertical upper section 76 joined to seat 72 at fold line 74 which extends upwardly to a generally inverted, U-shaped guide 78 formed in a bending operation of sheet 44 at fold lines 80 and 82.

Each of the bottom wall 46, side wall 48 and side wall 50 undergo further bending operations in the fabrication of tub 42 to form channels along their end edges. Specifically, opposed end edges 84 and 86 of the bottom wall 46 are folded along fold lines 88 and 90, respectively, in an inward direction toward the interior 51 of tub 42, forming a bottom mounting channel 92 at each end edge 84, 86, one of which is shown in the Figs. As such, an opening 94 in bottom mounting channel 92 faces the interior 51 of the tub 42. Similarly, opposed end edges 96 and 98 of side wall 48, and opposed end edges 100 and 102 of side wall 50, undergo bending operations along fold lines 88 and 90, respectively. The result is the formation of a side mounting channel 104 along the lower section 56 of side wall 48 and a side mounting channel 108 along the upper section 64 of side wall 48. Each of these side mounting channels 104 and 108 has an opening 110 and 114, respectively, which face the interior 51 of the tub 42. The bending operation noted above creates the same configuration in the opposite side wall 50. A side mounting channel 116 is formed along the vertical lower section 68 of side wall 50 and a side mounting channel 120 is formed along vertical upper section 76. Each of such side mounting channels 116 and 120 has an opening 122 and 126, respectively, which face the interior 51 of the tub 42.

It should be noted that unlike the prior art construction and fabrication method described above in connection with a discussion of FIGS. 1-5, there is no drop loss of material along the bottom wall 46 or side walls 48 and 50 of tub 42. The tub 42 is fabricated without removing the section 34 of material, depicted in FIG. 1, which saves a substantial amount of money in material cost.

Figure 9:
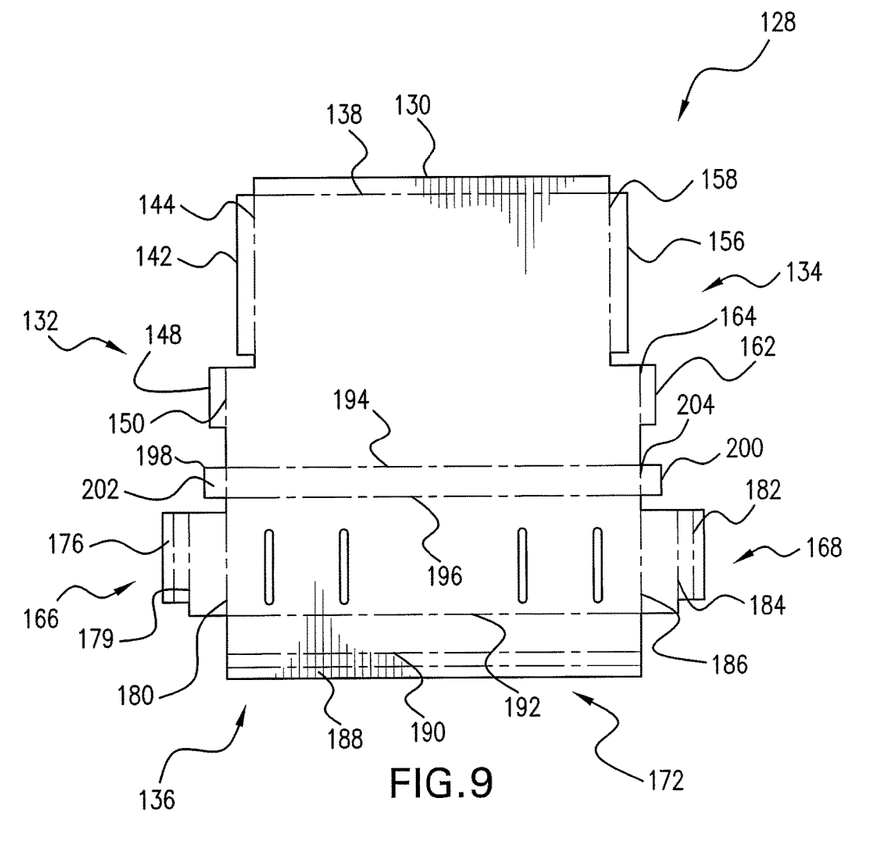
FIG. 9 is a plan view of a sheet employed to form an end wall for the cross-over box herein.
Figure 10:
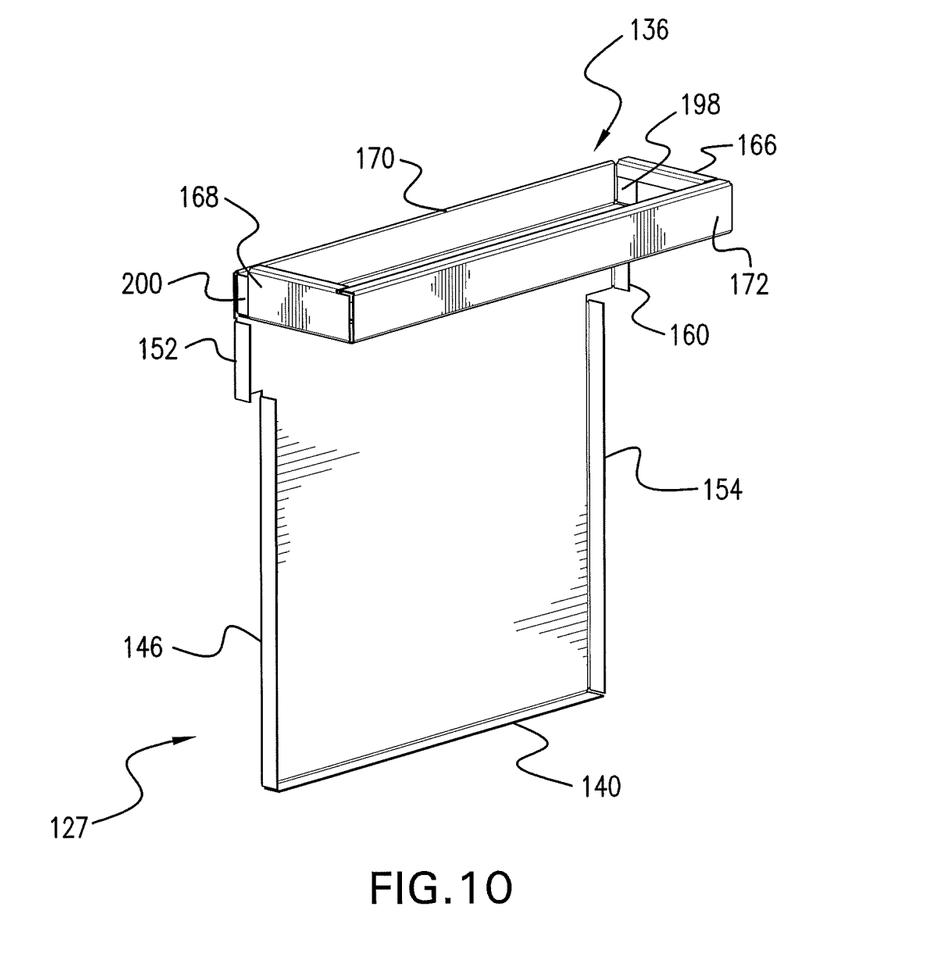
FIG. 10 is a perspective view of an end wall formed in a bending operation from the sheet illustrated in FIG. 9.

Referring now to FIGS. 9 and 10, the fabrication of an end wall 127 according to this invention is illustrated. The opposite end wall (not shown) of cross-over box 40 is fabricated in the same manner and the discussion below applies equally to same. The end wall 127 is made from a blank or sheet 128 of aluminum tread plate or similar material. It comprises a bottom edge 130, opposed side edges 132, 134 and an upper portion that undergoes bending operations to form a wing extension 136, described in more detail below. The bottom edge 130 is folded along fold line 138 to form a bottom flange 140. A lower section 142 of side edge 132 is folded along fold line 144 to form a lower side flange 146, and an upper section 148 of side edge 132 is bent along fold line 150 to form an upper side flange 152. The lateral or side-to-side dimension of the end wall 127 is greater at the upper portion thereof, beginning at the upper section 148 of the side edge 132 to and including the wing extension 136. The opposite side edge 134 of end wall 127 has a similar construction. It includes a lower side flange 154 formed by bending a lower section 156 of side edge 134 along fold line 158, and an upper side flange 160 formed by bending an upper section 162 of side edge 134 along fold line 164.

The wing extension 136 of end wall 127 comprises a front panel 166, a back panel 168 an inner panel 170 and an outer panel 172 collectively forming an open cavity or tray 174 within which tools or other items (not shown) may be stored. The front panel 166 is formed by a bending operation along fold lines 176, 178 and 180. The back panel 168 is formed in the same manner along fold lines 182, 184 and 186. The outer panel 172 undergoes a bending operation along fold lines 188, 190 and 192. The inner panel 170 is formed by that portion of the end wall 127 which extends vertically upwardly from the upper side flanges 152, 160 of respective side edges 132, 134, and it undergoes a bending operation along fold lines 194 and 196. Further, reinforcing tabs 198 and 200 extend outwardly from respective side edges 132, 134 of end wall 127. The tab 198 is folded along fold line 202 to overlap and reinforce a portion of the front panel 166, and tab 200 is folded along fold line 204 to overlap and reinforce a portion of the back panel 168. See FIG. 10.

Figure 11:
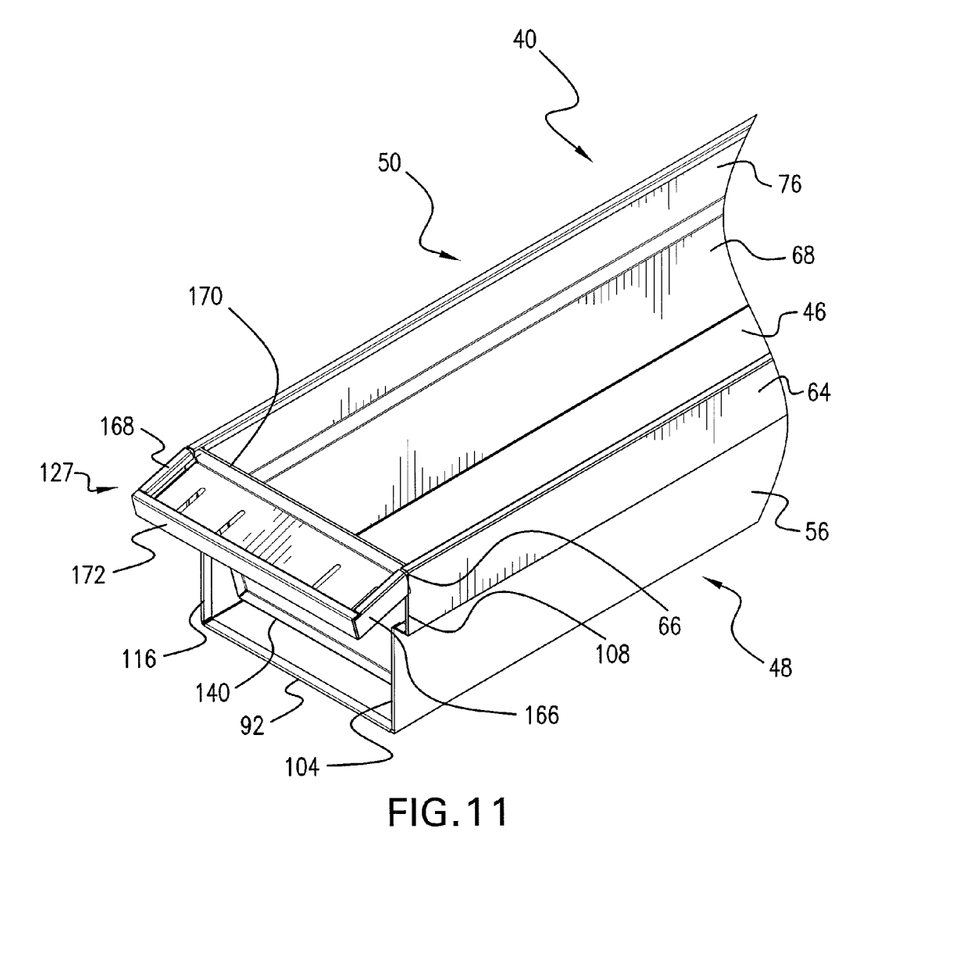
FIG. 11 is a perspective view of a portion of the tub and one end wall depicting an initial stage of assembling the cross-over box of this invention.
Figure 12:
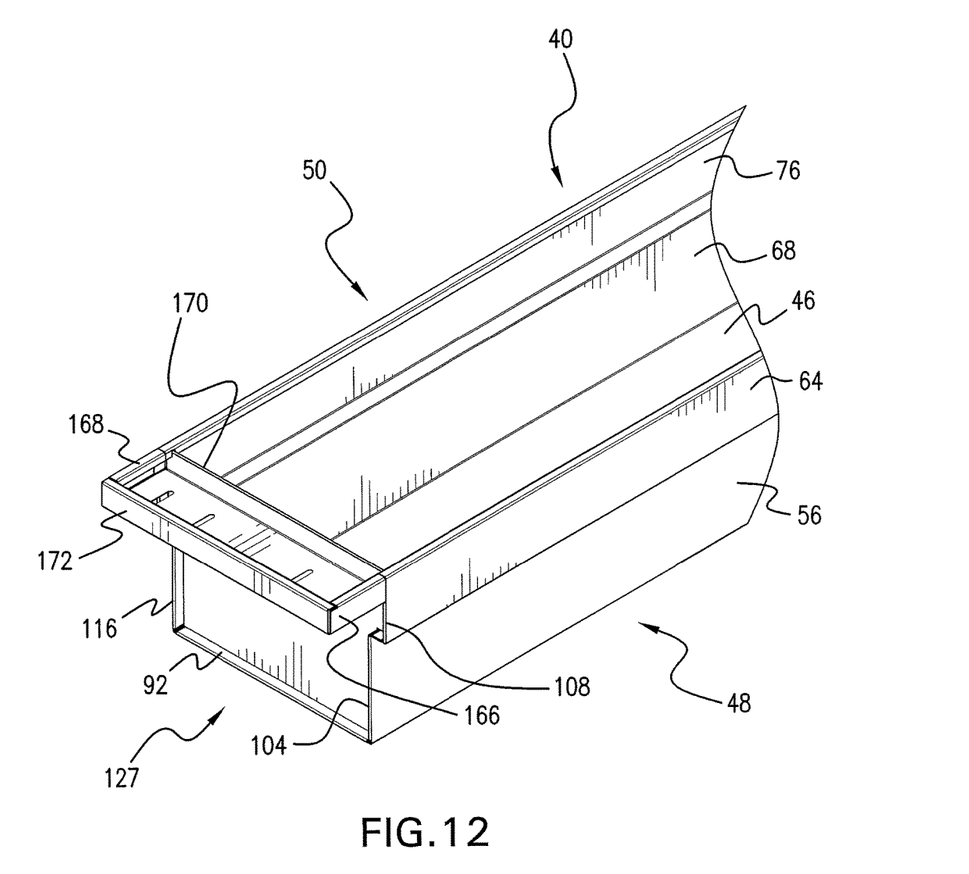
FIG. 12 is a perspective view similar to FIG. 11 but depicting the end wall connected to the tub.

With the tub 42 and end walls 127 fabricated as described above in connection with a discussion of FIGS. 6-10, assembly of the cross-over truck box 40 proceeds as shown in FIGS. 11 and 12. For ease of illustration, only one end of the tub 42 and end wall 127 are shown in the drawings, it being understood that the assembly process is identical at the opposite end of tub 42.

Initially, the end wall 127 is placed at an angle relative to the tub 42 such that its lower end is located within the tub interior 51. In this titled position, the inner panel 170 of wing extension 136 may be inserted into the guides 66 and 78 of respective side walls 48, 50 of tub 42, a portion of front panel 166 may be inserted into guide 66 of side wall 48 and a portion of back panel 168 may be inserted into guide 78 of side wall 50. As noted above, the side mounting channels 104 and 108 of the side wall 48 of tub 42, and the side mounting channels 116 and 120 of the tub side wall 50, are open to the interior 51 of the tub 42, i.e. the openings 110 and 114 of side mounting channels 104 and 108, as well as the openings 122 and 126 of side mounting channels 116 and 120, all face the tub interior 51. Since the end wall 127 is placed within the interior 51 of the tub 42, its side flanges 146, 152, 154 and 160 face outwardly from the tub interior 51. With the wing extension 136 aligned by guides 66, 78 as described above, the end wall 127 may be moved in an outward direction toward the end of tub 42. That is, with its upper portion at least partially extended into guides 66, 78, the lower portion of end wall 127 essentially swings in an outward direction toward the end of tub 42. In the course of such movement, the lower side flange 146 and upper side flange 152 of end wall 127 enter the side mounting channel 116 and side mounting channel 120, respectively, of the side wall 50 of tub 42; the lower side flange 154 and upper side flange 160 of end wall 127 enter respective side mounting channels 104 and 108 of tub side wall 48; and, the bottom flange 140 of end wall 127 enters the bottom mounting channel 92 of the bottom wall 46 of tub 42.

With the flanges 140, 146, 152, 154 and 160 of end wall 127 fully seated within the channels 92, 104, 108, 116 and 120 of tub 42, the end wall 127 may be secured to the tub 42 by any suitable means. In particular, the end wall 127 and tub 42 may be connected by tack welding the flanges and channels together, by crimping the channels against the flanges, or, by pouring, injecting or otherwise introducing an adhesive, urethane or other bonding material into the channels and along the flanges. This same process is repeated at the opposite end of the box 40 to connect the end wall 127 and tub 42 together.

Figure 13:
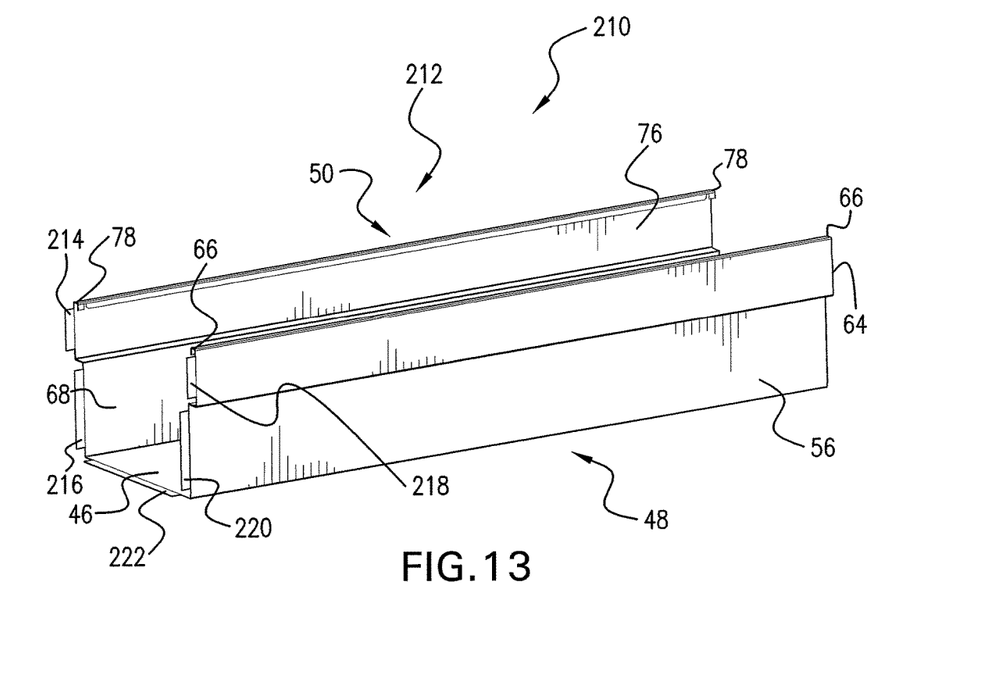
FIG. 13 is a perspective view similar to FIG. 8 illustrating an alternative embodiment of the tub herein.
Figure 14:
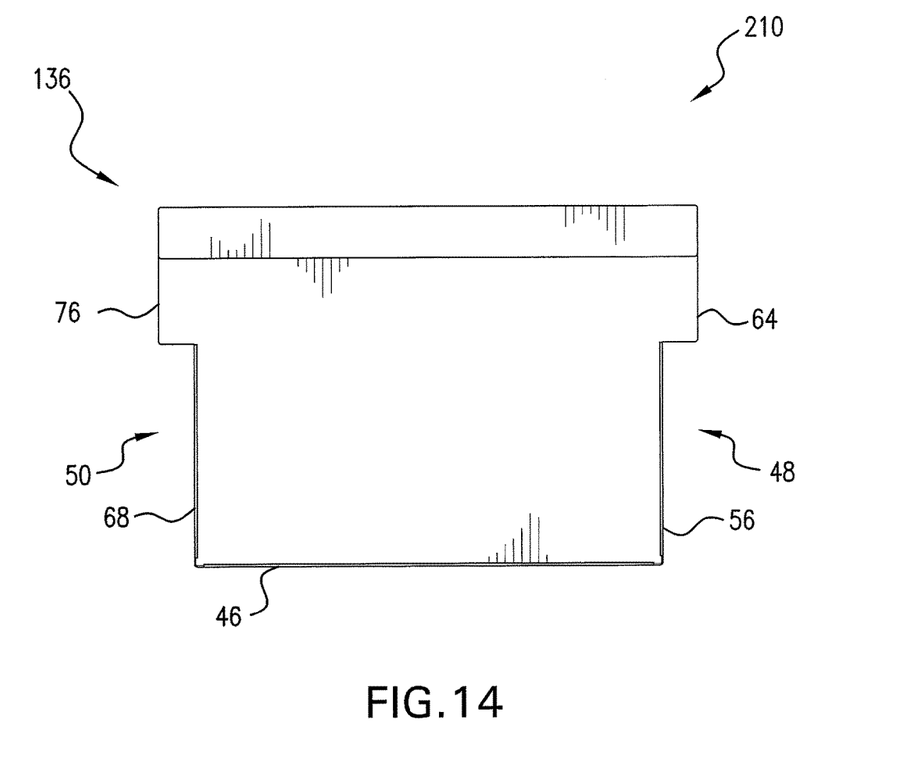
FIG. 14 is an end view of a cross-over box shown in FIG. 13 with an end wall connected to the tub.

Referring now to FIGS. 13 and 14, an alternative embodiment of a truck box 210 is illustrated having the same end walls 127 as box 40 but including a tub 212 with a different end edge configuration. In particular, opposite end edges of tub 212 are formed with outwardly projecting flanges, e.g. an upper tub side flange 214 and a lower tub side flange 216 extend from respective upper and lower sections 76, 68 of the tub side wall 50; an upper tub side flange 218 and a lower tub side flange 220 extend from respective upper and lower sections 64, 56 of the tub side wall 48; and, a bottom tub flange 222 extends from the bottom wall 46 of tub 212. In order to connect each end wall 127 of the box 212 to the tub 212, the side flanges 160 and 154 of end wall 127 are placed alongside the upper and lower tub side flanges 214, 216, respectively, of tub side wall 50; the side flanges 152 and 146 of end wall 127 are placed alongside respective upper and lower tub side flanges 218, 220 of the tub side wall 48; and, the bottom flange 140 of end wall 127 is placed alongside the bottom tub flange 222. A crimping operation is then performed on the adjacent flanges noted above to connect the end walls 127 to tub 212.

The construction and method of fabrication of the cross-over truck boxes 40 and 210 of this invention reduces waste of material, simplifies the manufacturing process by reducing or eliminating welding operations and decreases costs. Further, the strength of the boxes 40 and 210 is improved compared to truck boxes made according to prior art methods of fabrication in the area where the reinforcing tabs 198 and 200 are provided in the wing extension 136 of end walls 127.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. For example, the tub 42 is described above as being made from a blank or sheet 44 of aluminum tread plate or a similar material having bottom mounting channels 92 and side mounting channels 104, 108 each formed in a bending operation. It is contemplated that the tub 42 may be fabricated from plastic or other material capable of being molded such that the channels 92, 104 and 108 are integrally formed during the molding operation.

Therefore, it is intended that the invention not be limited to the particular embodiment disclosed as the best mode contemplated for carrying out this invention, but that the invention will include all embodiments falling within the scope of the appended claims.

What is claimed is:

1. A cross-over truck box, comprising:
   a one-piece tub including a bottom wall, a first side wall and a second side wall integrally formed to collectively define a tub interior, each of said bottom wall, said first side wall and said second side wall having opposed end edges, a bottom channel being formed in each of said opposed end edges of said bottom wall;
   each of said side walls of said tub comprising:
      (i) an end edge having an upper section formed with a guide channel, a lower section extending from said bottom wall and a seat located between said upper and lower sections;
      (ii) said upper section being formed with an upper channel located between said seat and said guide channel;
      (iii) said lower section being formed with a lower channel;
   a first end wall and a second end wall each comprising:
      (i) a bottom edge formed with a bottom flange;
      (ii) opposed side edges each formed with an upper side flange and a lower side flange, said lower side flange extending between said bottom flange and said upper side flange;
      (iii) a wing extension formed with a front panel having an upper edge, a back panel having an upper edge and opposed inner and outer panels interconnected to form a tray;
   each of said first and second end walls being positionable relative to one end of said tub so that said upper edge of each of said front and back panels of said wing extension extends into one of said guide channels of respective first and second side walls while said bottom section, said upper section and said lower section of each said end walls are located within said tub interior, each of said first and second end walls after having been located within said tub interior being movable to an assembled position wherein said bottom flange thereof extends into one of said bottom channels of said bottom wall on opposite ends of said tub and said upper and lower flanges thereof extend into respective upper and lower channels of said side walls on opposite ends of said tub, said bottom flange and said upper and lower flanges of each end wall being permanently affixed to said bottom wall and respective side walls of said tub after being moved to said assembled position.

2. The cross-over truck box of claim 1 in which each of said upper, lower and bottom channels is formed by a bending, operation.

3. The cross-over truck box of claim 1 in which each of said upper, lower and bottom channels is molded.

4. The cross-over truck box of claim 1 in which each of said upper side flanges, said lower side flanges and said bottom flanges of said first and second end walls is formed by a bending operation.

5. The cross-over truck box of claim 1 in which each of said first and second end walls is connected to said tub by tack welding said upper and lower side flanges and said bottom flanges of said first and second end walls within respective upper and lower channels and bottom channels of said tub.

6. The cross-over truck box of claim 1 in which each of said first and second end walls is connected to said tub by crimping together said upper and lower side flanges and said bottom flanges of said first and second end walls against respective upper and lower channels and bottom channels of said tub.

7. The cross-over truck box of claim 1 in which each of said first and second end walls is connected to said tub by adhering said upper and lower side flanges and said bottom flanges of said first and second end walls within respective upper and lower channels and bottom channels of said tub.

\* \* \* \* \*